(12) United States Patent
Radolan et al.

(10) Patent No.: US 12,254,896 B1
(45) Date of Patent: Mar. 18, 2025

(54) AUDIO SIGNAL DETECTOR

(71) Applicant: Dialog Semiconductor B.V., s-Hertogenbosch (NL)

(72) Inventors: Gavin Radolan, Merritt Island, FL (US); Yuan Chia Lu, Taipei (TW); Chih Chuan Chou, Taipei (TW); Ching-Hua Yeh, Irvine, CA (US)

(73) Assignee: Renesas Design Netherlands B.V., 's-Hertogenbosch (NL)

( * ) Notice: Subject to any disclaimer, the term of this patent is extended or adjusted under 35 U.S.C. 154(b) by 586 days.

(21) Appl. No.: 17/379,457

(22) Filed: Jul. 19, 2021

(51) Int. Cl.
*G10L 25/00* (2013.01)
*G10L 15/00* (2013.01)
*G10L 25/84* (2013.01)

(52) U.S. Cl.
CPC .............. *G10L 25/84* (2013.01); *G10L 15/00* (2013.01)

(58) Field of Classification Search
CPC ...................... G10L 25/84; G10L 15/00; G10L 2021/02082; G10L 21/0364; G10L 21/02; G10L 21/00; G10L 15/22; G10L 21/0208; G10L 2021/02085; G10L 2021/02087; G10L 2021/02168; G10L 21/0224; G10L 21/0272; G10L 21/028; G10L 21/0308; G10L 21/034; G10L 2021/0575; G10L 21/057; G10L 25/03; G10L 25/06; G10L 25/09; G10L 25/78; G10L 2025/783; G10L 2025/786; G10L 25/87; G10L 25/93; G10L 2025/932; G10L 2025/935; G10L 25/00; G10L 21/04

See application file for complete search history.

(56) References Cited

U.S. PATENT DOCUMENTS

| | | | |
|---|---|---|---|
| 6,094,492 A | 7/2000 | Boesen | |
| 7,383,181 B2 | 6/2008 | Huang et al. | |
| 11,361,763 B1 * | 6/2022 | Maas | G10L 15/18 |
| 2014/0067388 A1 * | 3/2014 | Manikandan | G10L 15/20 |
| | | | 704/233 |
| 2014/0093093 A1 * | 4/2014 | Dusan | H04R 3/005 |
| | | | 381/74 |
| 2014/0337036 A1 | 11/2014 | Haiut et al. | |

(Continued)

FOREIGN PATENT DOCUMENTS

WO 2014039243 A1 3/2014

OTHER PUBLICATIONS

T. Dekens, W. Verhelst, F. Capman and F. Beaugendre, "Improved speech recognition in noisy environments by using a throat microphone for accurate voicing detection," 2010 18th European Signal Processing Conference, Aalborg, Denmark, 2010, pp. 1978-1982. (Year: 2010).*

*Primary Examiner* — Edgar X Guerra-Erazo
(74) *Attorney, Agent, or Firm* — Saile Ackerman LLC; Stephen B. Ackerman (57) ABSTRACT

An audio signal detector comprising: an input adapted to receive a transducer signal; an output to provide an output signal indicative of the presence of a voice component in the transducer signal; and a processor circuit adapted to estimate a noise characteristic of the transducer signal; detect a voice component of the transducer signal; adjust one or more adjustable voice-activity parameters for detecting the voice component, wherein the said one or more adjustable voice-activity parameters are adjusted based on the noise characteristic; and generate the output signal.

20 Claims, 7 Drawing Sheets

(56) References Cited

U.S. PATENT DOCUMENTS

| | | | |
|---|---|---|---|
| 2015/0106087 A1* | 4/2015 | Newman | G10L 25/78 |
| | | | 704/233 |
| 2017/0287490 A1* | 10/2017 | Biswal | G10L 17/06 |
| 2023/0049593 A1* | 2/2023 | Zhou | H04R 1/245 |

* cited by examiner

AUDIO SIGNAL DETECTOR

TECHNICAL FIELD

The present disclosure relates to audio signal detectors and in particular to audio signal detectors for detecting a voice component in an audio signal.

BACKGROUND

Automatic Speech Recognition (ASR) enables the recognition and translation of spoken language into text by computers. This technology can be implemented in a variety of user devices such as earbuds, earpieces, mobile phones, computer devices and smart speakers, to name just a few.

ASR systems are generally configured to recognize one or more keywords spoken by the user of the user device and execute associated operations. A common problem of existing ASR systems is their susceptibility to performance degradation when user-voiced keywords are polluted by noise or other sounds. Low-power embedded automatic speech recognition systems are more susceptible to this problem than cloud-based ASR systems, as they must comply with the low-power constraints which rule out the use of heavy pre-processing techniques.

One way to improve keyword recognition performance in low-power embedded ASR systems is to pre-process the detected audio signal in order to filter out as much noise and otherwise unwanted content as possible prior to feeding the audio signal into the ASR system. This may be achieved by using a specially configured audio signal detector, such as a voice activity detector (VAD) or a noise gate.

VADs typically provide one output signal which can be in one of two logic states, for example a high logic state, also referred to as "open state" and a low logic state, also referred to as "closed state". When VADs detect voice activity, their output signal transitions from a close to an open state and when VADs detect the end of a voice activity their output signal transitions from an open to a closed state. The output signal of a VAD may be used to instruct the ASR to start "listening" when the VAD transitions to the open state, i.e. its output is in the high logic state, and to remain in a low-power mode, also referred to as sleeping mode, when the VAD is closed, i.e. when the output of the VAD is in the low logic state. However, existing VADs have various limitations.

Firstly, VADs have a finite sensitivity, as a result they are affected by a certain latency. Stated another way, a certain amount of time will lapse from a time when the signal fragment corresponding to the start of a voice activity is received by the VAD until a time when the VAD identifies the fragment as the start of a voice activity. This in turn may result in a delay in instructing the ASR to transition from its lower power, sleeping mode to its higher power, listening mode (also referred to as open mode. An excessive delay in turning on the ASR system can result in the beginning of a user keyword being lost and can sometimes cause incorrect keyword detection by the ASR system.

Secondly, VADs are affected by false positives, due for example to external noises or non-user voices which the VAD fails to distinguish from the user's voice. False triggers have a negative impact on performance in low-power implementations that use VAD decisions to throttle back, that is to switch to the sleeping mode, resulting in a waste of power. Furthermore, when frequently occurring, false triggers negatively impact the performance of the ASR system by causing the ASR system to switch to the listening mode unnecessarily, thereby wasting power.

Thirdly, VAD can be affected by missed triggers, that is, by voice activities which are missed. Missed triggers occur when the VAD misses a voice activity and always have a negative impact on ASR, since a part or all of the speech is lost.

Generally speaking, whenever a VAD is used as a front-end to an ASR system, the VAD acts as an early filter to remove unwanted noise and sounds, transmitting only the portion of the audio signal which contains the wanted voice activity. If the VAD detects a false trigger or misses a voice trigger, this will affect the sensitivity of the ASR system as a whole, as well as power performance.

In some implementation, the VAD output signal is fed to a further pre-processing module which checks whether or not the detected voice is a specific user's voice. When this check runs erroneously due to a false trigger, this means that even more power consumption occurs, and it increases the probability that the specific user might be wrongly detected. As the VAD is generally located at the front end of ASR systems, any false or missed triggers at the VAD level can only get worse as it propagates through the system.

An alternative to using a VAD in order to filter the signal which is sent to ASR systems, is to use a noise gates (NG). The principle of operation of a noise gate is similar to that of voice activity detectors. While the output of VADs is configured to be in the high logic (open) state whenever voice activity is detected and closed otherwise, the output of the noise gate is configured to be in the low logic (closed) state whenever noise is identified and to remain open otherwise. Similarly to VADs, noise gates are also affected by a degree of latency, that is, they require a finite amount of time to transition between the open and close states. Moreover, noise gates can also be susceptible to false triggers, particularly when the level of acoustic noise is too loud for the noise gate.

Typical applications in low-power consumer devices require highly accurate ASR performance in a variety of ambient noise conditions. For example, the ASR may be used while the user of the consumer device is listening to music, or sitting alone in a quiet room, walking along a sidewalk next to heavy traffic, on a phone call at a train station, etc. In certain cases, it is easy for the VAD or the noise gate to isolate the user's voice activity, however in others scenario, the underlying noise conditions may cause false triggers.

ASR performance is optimal when the VAD's or noise gate's output has minimum latency, minimum false triggers and high sensitivity (no missed triggers).

It is possible to reduce the latency of a VAD or noise gate system in order to improve its sensitivity, however that generally results in a higher false trigger rate when operating in high noise conditions. Conversely, if the VAD or noise gate are optimized to have minimum false trigger rate in high noise conditions, they are generally affected by higher latency and lower sensitivity.

Accordingly, there is a need for an audio signal detector which can find a balance between low-latency and low false-trigger rate.

SUMMARY

It is an object of the disclosure to address one or more of the above-mentioned limitations.

According to a first aspect of the disclosure there is provided: an audio signal detector comprising an input adapted to receive a transducer signal; an output to provide an output signal indicative of the presence of a voice component in the transducer signal; and a processor circuit adapted to: estimate a noise characteristic of the transducer signal; detect a voice component of the transducer signal; adjust one or more adjustable voice-activity parameters for detecting the voice component, wherein the said one or more adjustable voice-activity parameters are adjusted based on the noise characteristic; and generate the output signal.

Optionally, the processor circuit comprises a first estimator to estimate the noise characteristic of the transducer signal, and a second estimator to detect the voice component and to generate the output signal.

Optionally, the second estimator is configured to detect a start and an end of the voice component; and the output signal is a binary signal configured to transition from a first state to a second state when the start of the voice component is detected; and transition from the second state to the first state when the end of the voice component is detected.

Optionally, the audio signal detector further comprises an adjuster configured to adjust the said one or more voice-activity parameters based on the noise characteristic.

Optionally, the adjuster is configured to adjust the one or more voice activity parameters when the output signal is in the first state.

Optionally, the second estimator comprises an integrator configured to compute a first energy integral of the transducer signal over a first time interval; and the second estimator is configured to detect the presence of the voice component in the transducer signal based on the first energy integral and on the one or more adjustable voice-activity parameters.

Optionally, the one or more adjustable voice activity parameters comprise one or more start parameters and one or more end parameters; and the second estimator is configured to detect the start of the voice component and the end of the voice component based on the one or more start parameters and on the one or more end parameters respectively.

Optionally, the one or more start parameters comprise a start threshold; the one or more end parameters comprise an end threshold; and the second estimator is configured to: detect the start of the voice component upon identifying that the output signal is in the first state and the energy integral rises above the start threshold; and detects the end of the voice component upon identifying that the output signal is in the second state and the energy integral falls below the end threshold.

Optionally, the one or more voice activity parameters comprise one or more duration parameters; and the second estimator is configured to determine that the voice component has paused but not ended according to at least one of the one or more duration parameters.

Optionally, the first estimator comprises an integrator configured to compute a second energy integral of the transducer signal over a second time interval, the second time interval being longer than the first time interval; and the first estimator being configured to determine the noise characteristic of the transducer signal based on the second energy integral.

Optionally, the adjuster comprises a look-up table comprising one or more possible values of the noise characteristic and, for each value, a corresponding set of voice-activity parameter values; and the adjuster being configured to select the set of the voice-activity parameter values associated with the current noise characteristic value.

Optionally, the noise characteristic comprises at least one of a noise intensity level and a noise type.

Optionally, the transducer is a bone conduction sensor.

Optionally, the transducer has a bandwidth which is in the range of 600 Hz to 2 kHz.

Optionally, the audio signal detector further comprises a pre-processor coupled to the processor circuit, the pre-processor being configured to pre-process the transducer signal.

Optionally, the pre-processor comprises one or more of: an operational amplifier, an analog-to-digital converter, a high-pass filter, a buffer and an automatic gain controller.

Optionally, the pre-processor comprises one or more of the above components coupled in series.

According to a second aspect of the disclosure there is provided an automatic speech recognition (ASR) system, the system comprising a microprocessor adapted to execute an ASR software; a controller configured to control the microprocessor; and an audio signal detector; wherein the audio signal detector comprises an input adapted to receive a transducer signal; an output adapted to provide an output signal indicative of the presence of a voice component in the transducer signal; and a processor circuit adapted to: estimate a noise characteristic of the transducer signal; detect a voice component of the transducer signal, adjust one or more adjustable voice-activity parameters for detecting the voice component, wherein the said one or more adjustable voice-activity parameters are adjusted based on the noise characteristic; and generate the output signal.

Optionally, the processor circuit comprises a first estimator to estimate the noise characteristic of the transducer signal, and a second estimator to detect the voice component and to generate the output signal; the second estimator being configured to detect a start and an end of the voice component; and the controller being configured to: activate the ASR engine when the second estimator detects the start of the voice component; and deactivate the ASR engine when second estimator detects the end of the voice component.

According to a third aspect of the disclosure there is provided a user device comprising the ASR system according to the second aspect.

According to a fourth aspect of the disclosure there is provided a method of detecting an audio signal, the method comprising: receiving a transducer signal; estimating a noise characteristic of the transducer signal; detecting a voice component of the transducer signal; providing one or more adjustable voice-activity parameters for detecting the voice component; adjusting the one or more voice-activity parameters based on the noise characteristic; and generating an output signal indicative of the presence of the voice component in the transducer signal.

According to a fifth aspect of the disclosure there is provided a computer program product comprising instructions that, when executed by a computer, enable it to detect an audio signal by implementing the steps of: receiving a transducer signal; estimating a noise characteristic of the transducer signal; detecting a voice component of the transducer signal; providing one or more adjustable voice-activity parameters for detecting the voice component; adjusting the one or more voice-activity parameters based on the noise characteristic; and generating an output signal indicative of the presence of the voice component in the transducer signal.

The options described with respect to the first aspect of the disclosure are also common to the second, third, fourth and fifth aspects of the disclosure.

BRIEF DESCRIPTION OF THE DRAWINGS

The disclosure is described in further detail below by way of example and with reference to the accompanying drawings, in which.

DETAILED DESCRIPTION

Figure 1:
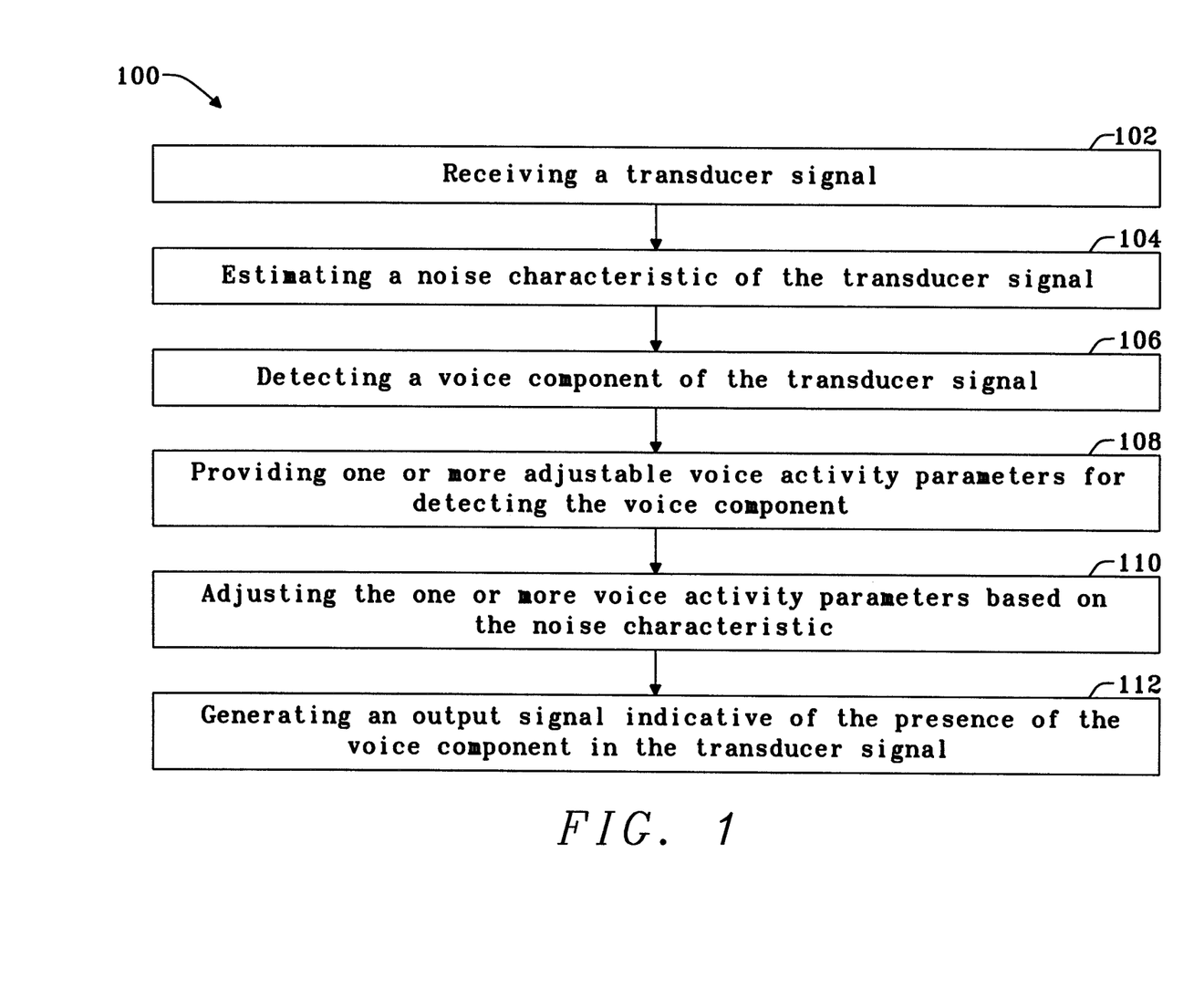
FIG. 1 is a flow diagram of a method of detecting an audio signal according to the disclosure.

FIG. 1 is a flow diagram of a method 100 of detecting an audio signal, according to the disclosure. The method 100 comprises: at step 102, receiving a transducer signal; at step 104, estimating a noise characteristic of the transducer signal; at step 106, detecting a voice component of the transducer signal; at step 108, providing one or more adjustable voice-activity parameters for detecting the voice component; at step 110, adjusting the one or more voice-activity parameters based on the noise characteristic; and at step 112, generating an output signal indicative of the presence of the voice component in the transducer signal.

The method 100 may be implemented in different ways. For instance, a computer program product, such as a software, may include instructions to implement the steps of the method 100. The program or algorithm is then executed on a processor or on a computing device comprising a processor.

Figure 2:
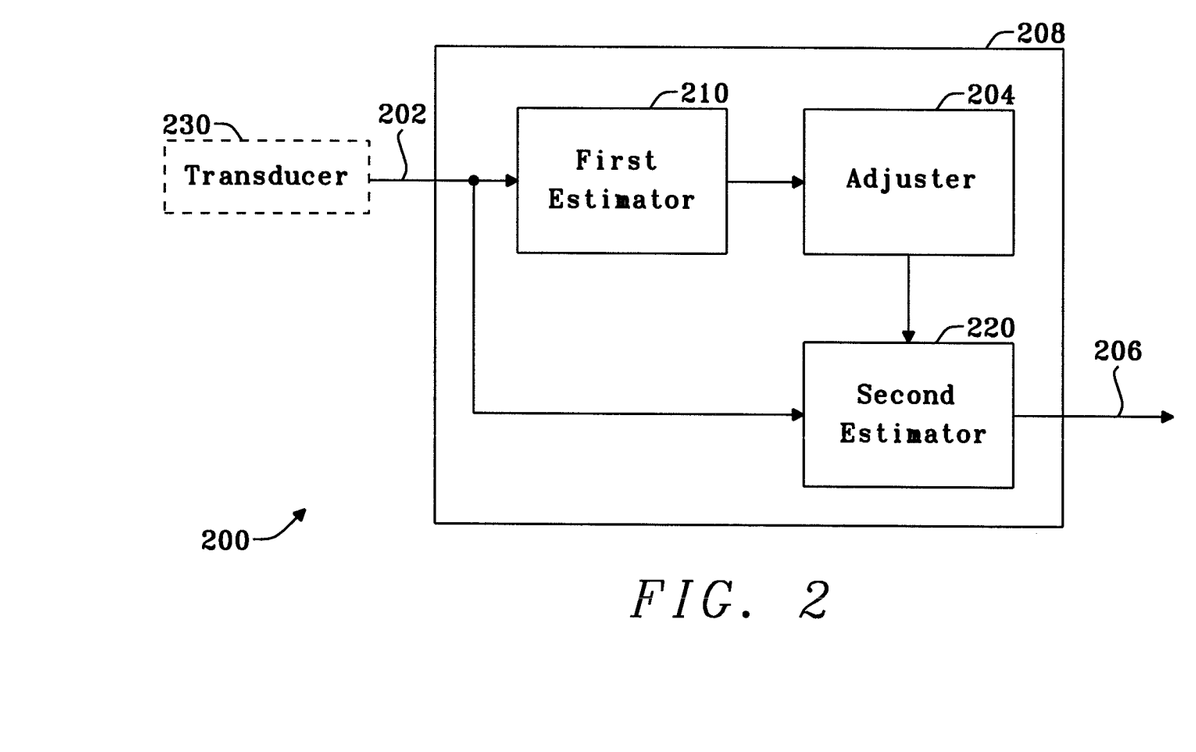
FIG. 2 is a schematic diagram of an audio signal detector according to the disclosure.

FIG. 2 is a schematic diagram of an audio signal detector 200 for implementing the method 100 of FIG. 1, according to the disclosure. The audio signal detector 200 has an input to receive a transducer signal 202 from a transducer 230 and an output for providing an output signal 206 indicative of the presence of a voice component in the transducer signal 202. The audio signal detector 200 further comprises a processor circuit 208 adapted to: estimate a noise characteristic of the transducer signal 202; detect a voice component of the transducer signal 202; adjust one or more adjustable voice-activity parameters for detecting the voice component based on the noise characteristic; and generate the output signal 206. For example, the processor circuit 208 may be a microprocessor adapted to interpret and execute program instructions.

In some embodiments, the processor circuit 208 comprises an adjuster 204, a first estimator 210 and a second estimator 220. The first estimator 210 is configured to estimate the noise characteristic of the transducer signal 202, and the second estimator 220 is adapted to detect a voice component of the transducer signal 202 and to generate the output signal 206. The second estimator 220 has one or more adjustable voice-activity parameters for detecting the voice component and the adjuster 204 is configured to adjust the one or more voice-activity parameters based on the noise characteristic detected by the first estimator 210.

The first estimator 210, the second estimator 220 and the adjuster 204 may be implemented in software or in hardware or in combination of software and hardware. For instance, the first estimator 210, the second estimator 220 and the adjuster 204 may be implemented as part of a computer program product to be executed on the processing circuit 208. Alternatively, the first estimator 210, the second estimator 220 and the adjuster 204 may be implemented as analog circuits. For instance, the first and second estimators could be implemented as integrator circuits using analog filters and programmable voltage comparators.

The output signal 206 is a signal indicative of the presence of the voice component in the transducer signal 202. For example, the output signal 206 may be a binary signal configured to transition from a first state to a second state when the start of the voice component is detected; and transition from the second state to the first state when the end of the voice component is detected.

The audio signal detector 200 may be used to implement a voice activity detector or a noise gate. By adjusting the voice activity parameters of the second estimator 220 based on the noise characteristic detected by the first estimator 210, the audio signal detector 200 allows to achieve an optimal trade-off between high sensitivity and low false trigger rate. Although the following disclosure focuses mainly on audio signal detector that implement a voice activity detector, it will be appreciated that the present disclosure may apply in an analogous way to audio signal detectors that implement noise gates, since these basically operate according to similar principles, the only difference being that the output signal of a noise gate would be indicative of a presence of noise rather than being indicative of a presence of voice.

In embodiments where the audio signal detector implements a voice activity detector, the first estimator 210 may also be referred to as "noise estimator" and the second estimator 220 may also be referred to as "voice estimator".

Any transducer may be used in combination with the audio signal detector 200, however for ASR applications a transducer which selectively detects the target user's voice and filters out background environment noise will be preferred, such as a bone conduction sensor.

Figure 3:
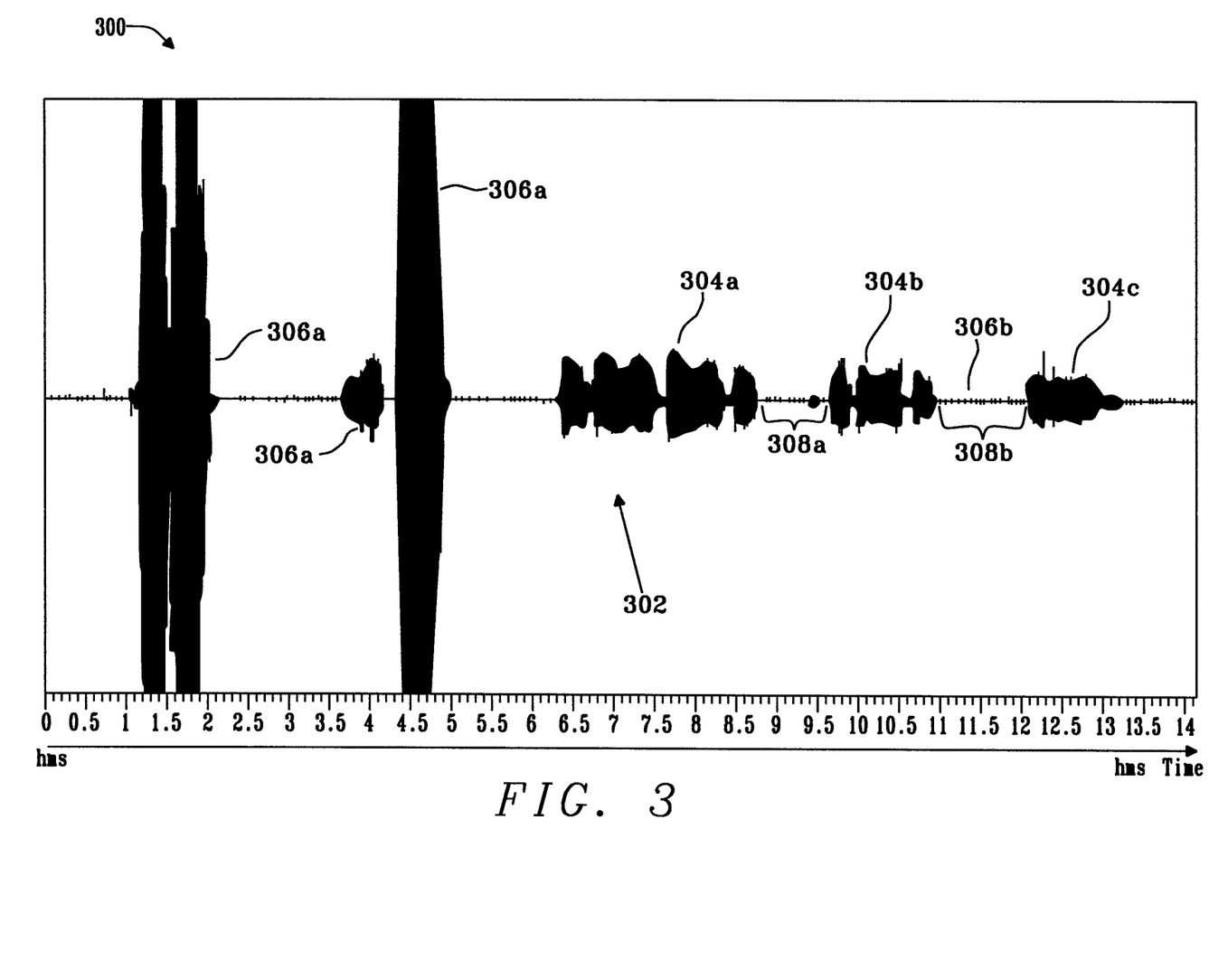
FIG. 3 is a graph illustrating the temporal evolution of an audio signal comprising a voice component.

FIG. 3 shows the temporal evolution of an audio signal 302 comprising a voice component 304 detectable by the audio signal detector 200. The voice component 304 of the signal 302 may comprise one or more voice activities. In the example shown in FIG. 3, the voice component 304 comprises three voice activities 304a, 304b and 304c, each separated by time intervals 308a, 308b, and so on.

The audio signal 302 further comprise noise 306. In this context the noise refers to any component of the audio signal 302 other than the voice activity which the audio signal detector 200 is meant to detect. For example, the audio signal detector 200 may be embedded in a portable user device having transducer 230 and be configured to detect only the voice activity of the user of the portable user device. However, the audio signal provided by the transducer 230 may pick up a certain amount of noise 306 in the form of environmental noise, white noise, or voice activity from other people speaking nearby. The user listening to music or performing a physical activity may also cause noise 306 to be present in the audio signal 302.

The noise 306 may comprise both high and low intensity noise components and long or short-term noise components. In the example of FIG. 3, the noise 306 comprises first environment noise components 306a and continuous low intensity noise components 306b that underly the audio signal 302 throughout the whole duration of the signal.

Figure 4:
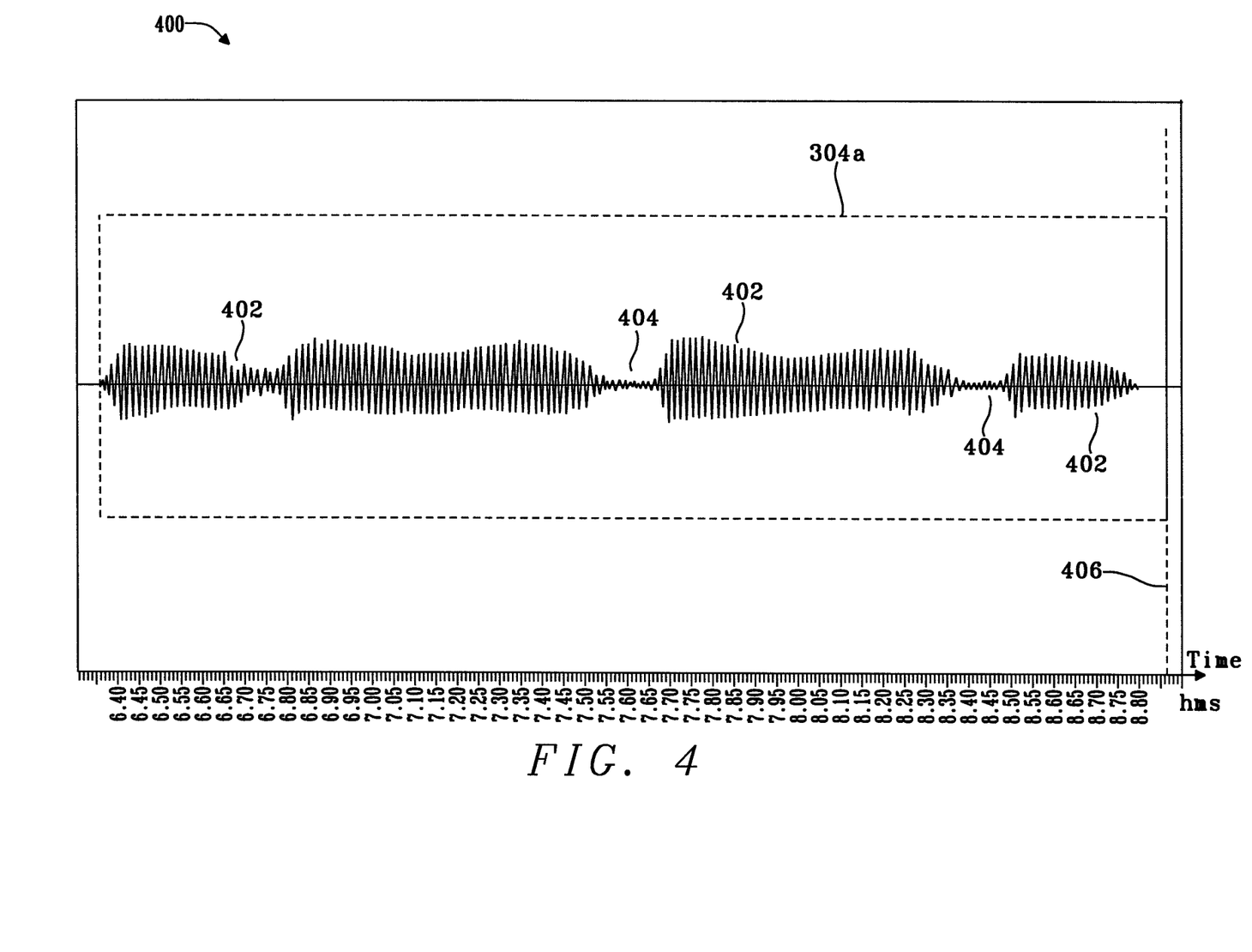
FIG. 4 is a close-up of a section of the audio signal of FIG. 3.

FIG. 4 shows a close-up of the voice activity 304a of FIG. 3. The voice activity 304a comprises a plurality of spoken words 402, separated by pauses 404.

As mentioned, the audio signal detector 200 may be used to detect the presence of voice component 304 in the audio signal 302. In some embodiments, the second estimator 220 is configured to detect the start and end of the voice component 304 and the output signal 206 is a binary signal configured to: transition from a first state (e.g. a logic 0) to a second state (e.g. a logic 1) when the start of the voice component 304 is detected; and transition from the second state to the first state when the end of the voice component 304 is detected. However, when a pause 404 occurs the output signal 206 is configured so that it remains in the second (high) state and does not transit to the first state. The output signal 206 should only change to the first (low) state when the whole voice activity 304 has terminated at time 406.

In some embodiments, the adjuster 204 is configured to adjust the one or more voice activity parameters only when the output signal 206 is in the first state, that is, when there is no voice activity being detected. However, in other embodiments, the adjuster 204 may continuously update the voice activity parameters of the second estimator 220 irrespective of whether the audio signal detector 200 is or is not currently detecting a voice component.

The noise characteristic detected by the first estimator 210 may comprise a noise intensity level. For example, with reference to the audio signal 302 of FIGS. 2 and 3, the transducer signal 202 may be generated by the transducer 230 upon detecting the audio signal 302. The first estimator 210 may be configured to estimate the intensity of noise 306 in the transducer signal 202 over a first time interval T1 and the adjuster 204 may be configured to determine whether the intensity of noise 306 falls within one of a plurality of predetermined intensity ranges and adjust the one or more voice activity parameters based on which range the current noise intensity falls into. The noise characteristic may also comprise a noise quality or a noise type. For example, the first estimator 210 may be configured to estimate whether the current noise 306 is due to music in the background, physical activity, nearby voices, city traffic, or other types of noise etc. The adjuster 204 may be configured to adjust the one or more voice activity parameters based on which noise type is detected by the first estimator 210.

In its simplest form, the adjuster 204 may comprise a look-up table which comprises one or more possible values of the noise characteristic and, for each value, a corresponding set of voice-activity parameter values. The adjuster 204 may be configured to select the set of voice-activity parameter values associated with the current noise characteristic value detected by the first estimator. The adjuster 204 may comprise a memory for storing the look-up table.

Alternatively, the adjuster may use a machine learning algorithm to obtain the set of voice-activity parameter values.

The time interval T1 over which the first estimator 210 detect the noise characteristic is preferably much longer than a time interval T2 over which the second estimator detects the presence of the voice component. For example, the time interval T1 may be around 21 msec (128 samples at 6 kHz) and the time interval T2 may be around 1.3 milliseconds (8 samples at 6 kHz). The time interval T2 over which the second estimator 220 is configured to detect the presence of the voice component may be kept below a predetermined time threshold so as to minimize the latency of the output signal 206 in response to the start or end of a voice activity 304 as well as to minimize the amount of processing and memory resources required to buffer the transducer signal 202 in order for the estimator 220 to detect the voice component.

In an exemplary embodiment, the first estimator 210 comprises an integrator configured to compute or estimate a first energy integral of the transducer signal 202 over the first time interval T1 and to detect the noise characteristic based on said first time integral; while the second estimator 220 comprises an integrator configured to compute or estimate a second energy integral of the transducer signal 202 over the second time interval T2 and to detect the presence of the voice component based on the energy integral and on the one or more adjustable voice-activity parameters. The duration of the second time interval depends on the sample rate of the transducer signal 202. In some embodiments, the second time interval T2 is around 1.3 milliseconds or 8 samples at 6 kHz.

Several parameters may be required to identify the start and the end point of each voice activity 304. For instance, the one or more adjustable voice activity parameters may include one or more start parameters and one or more end parameters. In this case the second estimator 220 is configured to detect the start of the voice component and the end of the voice component based on the one or more start parameters and on the one or more end parameters respectively.

The one or more start parameters may include a start threshold. Similarly, the one or more end parameters may include an end threshold. In this case the second estimator 220 is configured to use the start threshold to determine when the voice activity starts and the end threshold to determine when the voice activity ends. For instance, the second estimator 220 is configured to detect the start of the voice component upon identifying that i) the output signal 206 is in the first state (no presence of voice component is being detected by the second estimator 220) and ii) the second energy integral computed by the second estimator 220 rises above the start threshold. Similarly, the second estimator 220 is configured to detect the end of the voice component upon identifying that i) the output signal 206 is in the second state (presence of voice component is being detected by the second estimator 220) and ii) the second energy integral falls below the end threshold.

In some embodiments, the second estimator 220 is configured to detect the start of the voice component upon identifying that the second energy integral rises above the start threshold and remains above the start threshold for a time longer than a first duration threshold. For example, the first duration threshold could be 3 to 18 sample periods, in which the sample period is the sample period of the transducer signal 202.

The audio signal detector 200 may comprise an oscillator to provide a clock signal. At any given time $t_N$ the determination of the output signal 206 being in the first or second state may be based on the output signal 206 at time $t_{N-1}$.

The voice activity parameters may also include one or more further duration parameters for allowing the second estimator 220 to distinguish between a pause and the end of a voice activity. For instance, a second duration threshold may be used such that when the second energy integral decreases below the end threshold and remains below the end threshold for a time shorter than the second duration threshold, the second estimator 220 detects that there is a pause in the voice activity. When the second energy integral decreases below the end threshold and remains below the end threshold for longer than the second duration threshold, the second estimator 220 detects the end of the speech.

The audio signal detector 200 may comprise a first and a second buffer in order for the integrator of the first and second estimator to compute or estimate the signal energy level over the first time interval T1 and the second time interval T2 respectively.

The first estimator may detect the noise characteristic based on the value of the first energy integral at a single point in time. Alternatively, the first estimator 210 may be configured to detect the noise characteristic based on an average or other measure of the temporal evolution of the second energy integral over multiple time points. Similarly, the second estimator 220 may detect the presence of the voice component based on the value of the second energy integral computed by its integrator at a single point in time or based on an average or other measure of the temporal evolution of the second energy integral over multiple time points.

In preferred embodiments, the first estimator is configured to detect the noise characteristic based only on a single magnitude value of the first energy integral computed over the time T1 and the second estimator is configured to detect the voice component based only on a single magnitude value of the second energy integral computer over the time T2. This approach reduces processing time and energy consumption. However, it will be appreciated that in other embodiments the first and second estimators may be configured to use the shape of the transducer signal, of the first integral, of the second integral or a combination thereof to achieve higher precision and sensitivity, albeit at the cost of requiring more processing resources.

The audio signal detector 200 may be implemented in wearable devices which are voice-activated. Preferably, the audio signal detector 200 will be used in conjunction with a transducer 230 which has a lower bandwidth than typical audio transducers, such that high frequency noise is minimal in the transducer signal 202 and the voice component is maximized. Typical audio transducers such as traditional air-microphones have a bandwidth in the range 10-20 kHz. For instance, a transducer having a bandwidth in the range 600 Hz to 2 kHz maybe used in conjunction with the audio signal detector 200.

More specifically, the audio signal detector 200 will provide optimal performance when used in conjunction with transducers which are sensitive to mechanical vibrations induced by the user's speech, such as g-sensors or bone-conduction-sensors, rather than sound pressure or air-microphones. This is because a typical air-microphone is more likely to detect false triggers by non-user's voices or background disturbances, which would reduce the accuracy of the first estimator 210 and impair the auto-adaptation of the voice activity parameters. G-sensors transduce directional movements using a 3-D coordinate system and output a vector specifying the quantity of movement in each direction, X,Y,Z. Vibrations from the user's voice are picked up by g-sensors and bone sensors with much higher specificity than a typical air-microphone.

Figure 5:
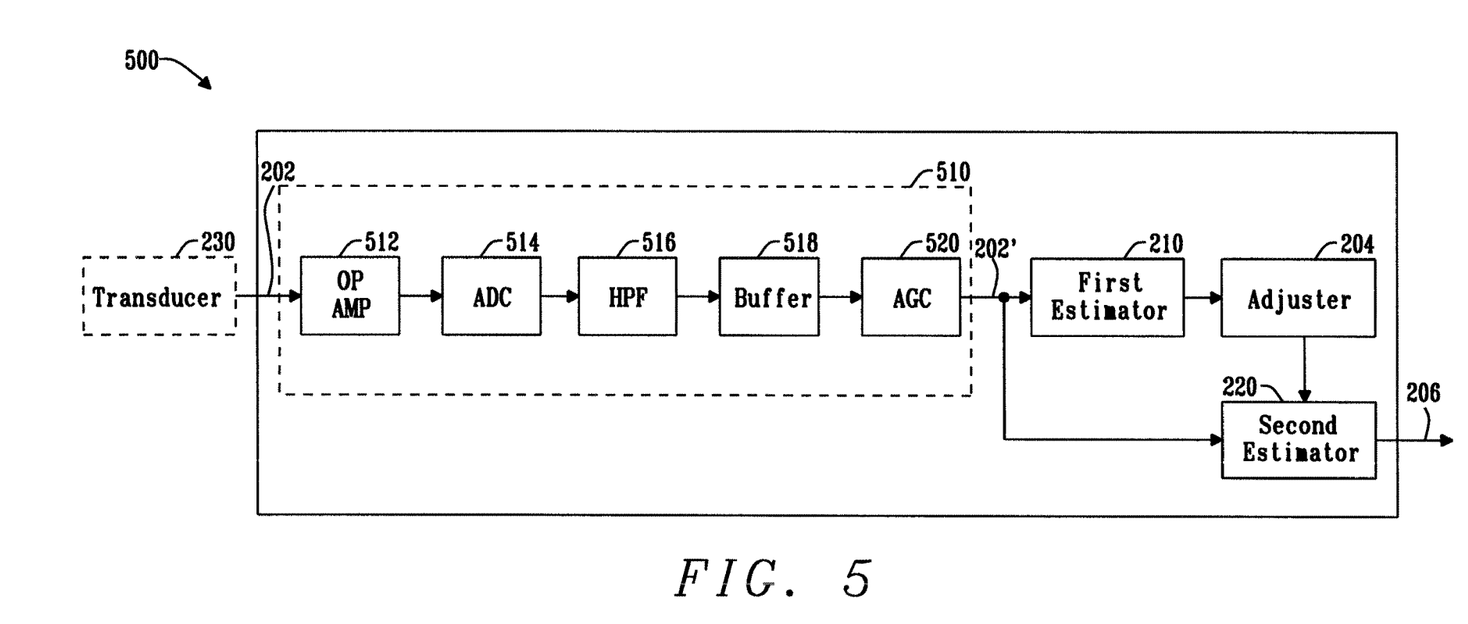
FIG. 5 is an exemplary implementation of the audio signal detector of FIG. 2.

FIG. 5 is an exemplary implementation of the audio signal detector of FIG. 2. In this specific embodiment, the audio signal detector 500 comprises a pre-processor 510 configured to pre-process the transducer signal 202 before it is provided to the first estimator 210 and the second estimator 220. The pre-processor 510 comprises an operational amplifier (OP AMP) 512, an analog-to-digital converter (ADC) 514 a high-pass filter (HPF) 516, a buffer 518 and an automatic gain controller (AGC) 520, all coupled in series.

In operation, the transducer signal 202 is first fed to the operational amplifier 512 for amplification, then converted into a digital transducer signal by the ADC 514. The digital output is then filtered by the high-pass filter 516 to remove the DC component of the signal. The pre-conditioned transducer signal is then provided to the buffer 518. The buffer 518 is configured to store a pre-determined temporal portion of the pre-conditioned transducer signal, for example the temporal portion may last 2 ms. Lastly, the automatic gain controller 520 adjusts the pre-conditioned transducer signal intensity level within a predetermined programmable range which is optimal for detection by the first and second estimators. The automatic gain controller 520 may be configured to adjust the pre-conditioned transducer signal intensity level based on one or more AGC parameters, such as: i) attack/release time constants for increasing/decreasing gain; ii) a lower bound on the gain, to control minimum sensitivity; iii) an attenuation depth limit, to prevent the AGC from attenuating the voice component too much in response to ambient noise. The pre-processed transducer signal 202' is then provided to the first estimator 210 and the second estimator 220.

It will be appreciated that FIG. 5 illustrates one of many possible implementations of the pre-processor 510. In other embodiments one or more of the components of the pre-processor 510 may be omitted, provided in a different order, or additional pre-processing stages may be added.

Figure 6:
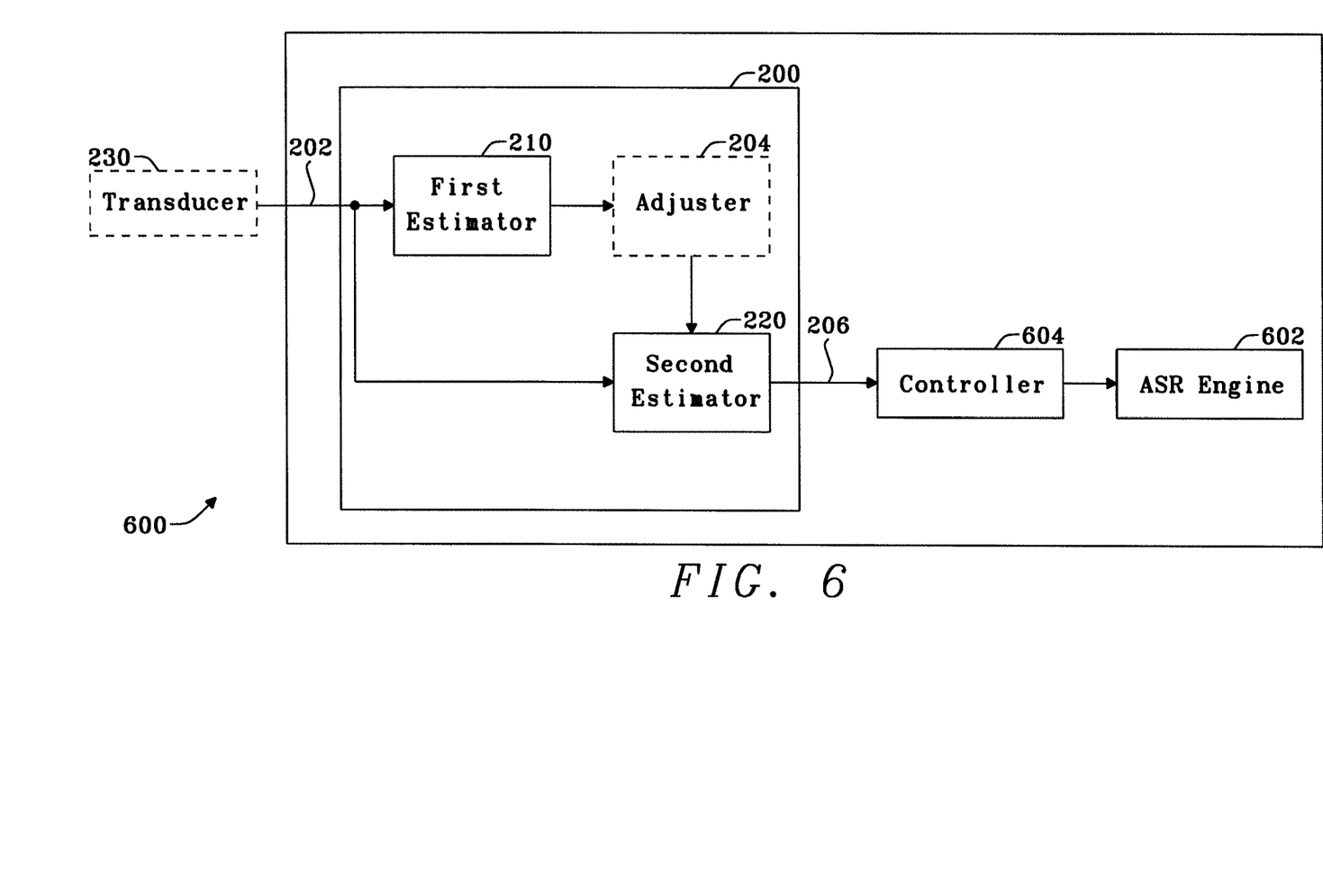
FIG. 6 is a schematic diagram of an automatic speech recognition system according to the disclosure.

FIG. 6 is a schematic diagram of an automatic speech recognition (ASR) system 600 provided with an audio signal detector according to FIG. 2.

The system 600 comprises: a microprocessor 602 adapted to execute an automatic speech recognition algorithm, also described as ASR software engine or simply ASR engine, a controller 604 configured to control the microprocessor 602; and the audio signal detector 200. In some embodiment of the system 600, the second estimator 220 is configured to detect a start and an end of the voice component; and the controller 604 is configured to activate or instruct the microprocessor 602 to switch to a high-power mode (also referred to as listening mode) whenever the second estimator 220 detects the start of the voice component; and to deactivate or instruct the microprocessor 602 to switch to a low-power mode, (also referred to as sleeping mode) whenever the second estimator 220 detects the end of the voice component. In this way, the power consumption of the microprocessor is significantly reduced as compared to when the ASR is always activated.

The ASR system 600 may be implemented in a user device which may be a wearable device such as an earbud or earpiece device configured to receive user voice commands. The ASR system 600 may be configured to receive the transducer signal 202 and determine which words or commands have been spoken by the user.

Using the audio signal detector 200 as a pre-stage for the microprocessor 602 allows to adjust the voice activity parameters of the second estimator 220 according to the present noise conditions. In turns this permits to achieve a trade-off between high sensitivity and low false trigger rate in detecting the voice component, thereby improving the accuracy and power performance of the ASR system 600. If fixed parameters were used in the second estimator 220, in high noise settings the audio signal detector 200 could be affected by sub-optimal latency and/or sub-optimal false trigger rate. This would result in a lower accuracy of the microprocessor 602, more false activations and increased power consumption.

Figure 7:
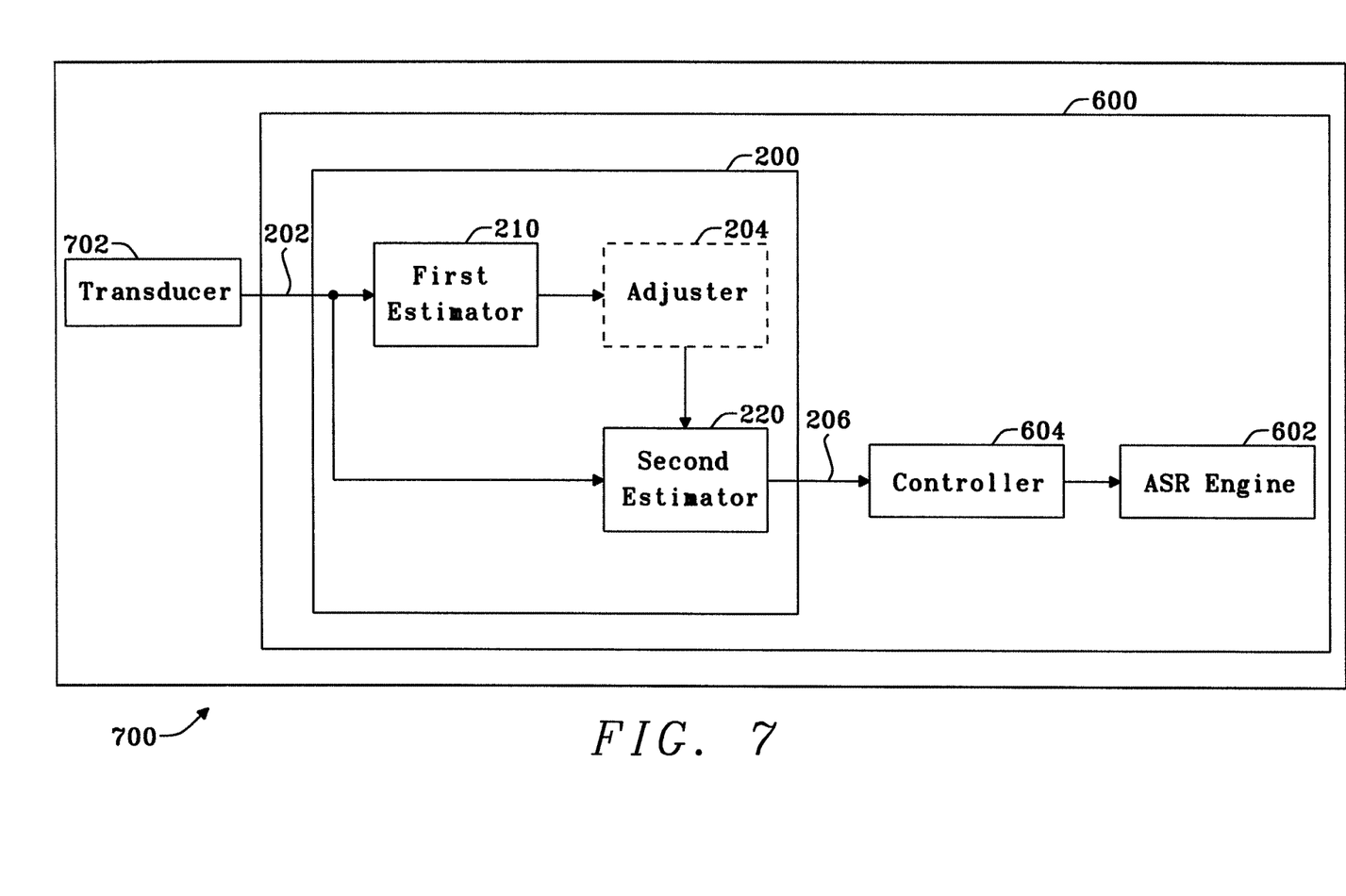
FIG. 7 is a schematic diagram of a user device comprising the automatic speech recognition system of FIG. 6.

FIG. 7 is a schematic diagram of a user device 700 provided with the automatic speech recognition system of FIG. 6.

The user device 700 comprises a transducer 702 and the automatic speech recognition (ASR) system 600. In preferred embodiments, the transducer 702 is a transducer sensitive to mechanical vibrations from the user's speech, such as a g-sensor or a bone-conduction-sensor. Transducers sensitive to mechanical vibrations are generally less subject to false triggers by non-user's voices or disturbances compared to typical sound pressure microphones. Hence using transducers sensitive to mechanical vibrations allows to maximize the accuracy of the first estimator and, in turn, enable better auto-adaptation of the VAD parameters. In preferred embodiments, the transducer 702 is a transducer with a relatively low audio bandwidth, for example ranging from about 600 Hz to about 2 kHz, rather than the typical 10-20 kHz.

This allows to reduce the impact of high frequency noise, further increasing the VAD accuracy of the audio signal detector 200.

The audio signal detectors according to the present disclosure allow to implement adaptive VAD systems and adaptive noise gates, that is VAD systems and noise gates whose parameters are adapted in real-time according to the current noise conditions. In the presence of background noise the sensitivity is lowered to reduce the occurrence of false triggers and when there is no noise in the background the sensitivity is increased.

Compared to prior adaptive audio signal detector systems which require heavy signal processing and high computational power in order to distinguish voice components from music or other background noise components, the detectors of the present disclosure may be implemented using very small micro-controllers. Hence, the systems and method of the present disclosure allow to achieve high sensitivity and low false triggers rate with minimal processing power, making them suitable for low-cost, low-power embedded systems.

The VAD system and methods according to the present disclosure enable ASR with improved performance for commands applied while user listens to music and/or is located in a noisy environment. Moreover, the VAD system and methods according to the present disclosure allow for reduced power consumption, by reducing the VAD false trigger rate during music playback and in noisy conditions. Furthermore, the VAD system and methods according to the present disclosure provide higher ASR performance in non-high noise situations by adaptively increasing sensitivity when ambient noise is low. Lastly, the audio signal detector and methods according to the present disclosure allow to implement ASR system which have improved controlled throttling performance, thanks to the lower false trigger rate and higher sensitivity which ensure the ASR is in the listening mode only when voice activity is present.

What is claimed is:

1. An audio signal detector comprising:
an input to receive a transducer signal from a transducer;
an output to provide an output signal indicative of the presence of a voice component in the transducer signal; and
a processor circuit adapted to:
estimate a noise characteristic of the transducer signal;
detect a voice component of the transducer signal;
adjust one or more adjustable voice-activity parameters for detecting the voice component, wherein the one or more adjustable voice-activity parameters are adjusted based on the noise characteristic of the transducer signal; and
generate the output signal,
wherein the noise characteristic of the transducer signal comprises at least one of a noise intensity level and a noise type.

2. The audio signal detector as claimed in claim 1, wherein the processor circuit comprises: a first estimator to estimate the noise characteristic of the transducer signal, and a second estimator to detect the voice component and to generate the output signal.

3. The audio signal detector as claimed in claim 2, wherein the second estimator is configured to detect a start and an end of the voice component; and wherein the output signal is a binary signal configured to
transition from a first state to a second state when the start of the voice component is detected; and
transition from the second state to the first state when the end of the voice component is detected.

4. The audio signal detector as claimed in claim 3, wherein the audio signal detector further comprises an adjuster configured to adjust the one or more voice-activity parameters based on the noise characteristic.

5. The audio signal detector as claimed in claim 4, wherein the adjuster is configured to
adjust the one or more voice-activity parameters when the output signal is in the first state.

6. The audio signal detector as claimed in claim 2, wherein
the second estimator comprises an integrator configured to compute a first energy integral of the transducer signal over a first time interval; and
the second estimator is configured to detect the presence of the voice component in the transducer signal based on the first energy integral and on the one or more adjustable voice-activity parameters.

7. The audio signal detector as claimed in claim 6, wherein
the one or more adjustable voice-activity parameters comprise one or more start parameters and one or more end parameters; and
the second estimator is configured to detect the start of the voice component and the end of the voice component based on the one or more start parameters and on the one or more end parameters, respectively.

8. The audio signal detector as claimed in claim 7, wherein
the one or more start parameters comprise a start threshold;
the one or more end parameters comprise an end threshold; and
the second estimator is configured to:
detect the start of the voice component upon identifying that the output signal is in the first state and the first energy integral rises above the start threshold; and
detect the end of the voice component upon identifying that the output signal is in the second state and the first energy integral falls below the end threshold.

9. The audio signal detector as claimed in claim 1, wherein
the one or more voice-activity parameters comprise one or more duration parameters; and
the second estimator is configured to determine that the voice component has paused but not ended according to at least of the one or more duration parameter.

10. The audio signal detector as claimed in claim 6, wherein
the first estimator comprises an integrator configured to compute a second energy integral of the transducer signal over a second time interval, the second time interval being longer than the first time interval; and
the first estimator being configured to determine the noise characteristic of the transducer signal based on the second energy integral.

11. The audio signal detector as claimed in claim 4, wherein
the adjuster comprises: a look-up table comprising one or more noise characteristic values of the noise characteristic and, for each noise characteristic value, a corresponding set of voice-activity parameter values; and
the adjuster being configured to select the set of the voice-activity parameter values associated with the current noise characteristic value.

12. The audio signal detector as claimed in claim 1, wherein the noise type comprises at least one of music in the background, physical activity, nearby voices and/or city traffic; and wherein the processor circuit is adapted to:
estimate the noise intensity level over a first time interval; and
determine whether the noise intensity level falls into one of a plurality of predetermined noise intensity ranges.

13. The audio signal detector as claimed in claim 1, wherein the transducer is a bone conduction sensor.

14. The audio signal detector as claimed in claim 1, wherein the transducer has a bandwidth ranging from about 600 Hz to about 2 KHz.

15. The audio signal detector as claimed in claim 1, wherein the audio signal detector further comprises a pre-processor coupled to the processor circuit, the pre-processor being configured to pre-process the transducer signal.

16. An automatic speech recognition (ASR) system, the system comprising:
a microprocessor adapted to execute an ASR software;
an audio signal detector; and
a controller adapted to receive an output signal from the audio signal detector and to generate a control signal to control the microprocessor;
wherein
the audio signal detector comprises:
an input adapted to receive a transducer signal;
an output to provide the output signal, the output signal being indicative of the presence of a voice component in the transducer signal; and
a processor circuit adapted to:
estimate a noise characteristic of the transducer signal;
detect a voice component of the transducer signal,
adjust one or more adjustable voice-activity parameters for detecting the voice component, wherein the one or more adjustable voice-activity parameters are adjusted based on the noise characteristic of the transducer signal; and
generate the output signal,
wherein the noise characteristic of the transducer signal comprises at least one of a noise intensity level and a noise type.

17. The ASR system as claimed in claim 16, wherein the processor circuit comprises a first estimator to estimate the noise characteristic of the transducer signal, and a second estimator to detect the voice component and to generate the output signal; the second estimator being configured to detect a start and an end of the voice component; and the controller being configured to:
activate the microprocessor when the second estimator detects the start of the voice component; and
deactivate the microprocessor when second estimator detects the end of the voice component.

18. A user device comprising the ASR system as claimed in claim 16.

19. A method of detecting an audio signal, the method comprising:
receiving a transducer signal;
estimating a noise characteristic of the transducer signal;
detecting a voice component of the transducer signal;
providing one or more adjustable voice-activity parameters for detecting the voice component;
adjusting the one or more voice-activity parameters based on the noise characteristic of the transducer signal; and
generating an output signal indicative of the presence of the voice component of the transducer signal,
wherein the noise characteristic of the transducer signal comprises at least one of a noise intensity level and a noise type.

20. A non-transitory computer readable medium comprising instructions that, when executed by a computer, enable it to detect an audio signal by:
receiving a transducer signal;
estimating a noise characteristic of the transducer signal;
detecting a voice component of the transducer signal,
providing one or more adjustable voice-activity parameters for detecting the voice component;
adjusting the one or more voice-activity parameters based on the noise characteristic of the transducer signal; and
generating an output signal indicative of the presence of the voice component in the transducer signal,
wherein the noise characteristic of the transducer signal comprises at least one of a noise intensity level and a noise type.

* * * * *